(12) United States Patent
Spindelbalker

(10) Patent No.: US 7,147,322 B2
(45) Date of Patent: Dec. 12, 2006

(54) FORM-FITTING CONNECTION BETWEEN A PIECE OF WIRE AND AN INJECTION-MOLDED PLASTIC BODY, PARTICULARLY FOR EYEGLASSES

(75) Inventor: Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 10/508,291

(22) PCT Filed: Mar. 27, 2003

(86) PCT No.: PCT/AT03/00086

§ 371 (c)(1),
(2), (4) Date: Sep. 17, 2004

(87) PCT Pub. No.: WO03/083554

PCT Pub. Date: Oct. 9, 2003

(65) Prior Publication Data

US 2005/0162608 A1    Jul. 28, 2005

(30) Foreign Application Priority Data

Apr. 3, 2002    (AT)    ............ A 517/2003

(51) Int. Cl.
  *G02C 5/12*    (2006.01)
(52) U.S. Cl. .............. 351/138; 351/80; 351/136
(58) Field of Classification Search .......... 351/136, 351/138, 137, 139, 41, 78, 80
See application file for complete search history.

(56) References Cited

U.S. PATENT DOCUMENTS 6,007,200 A    12/1999    Tachibana

| 6,283,592 B1 * | 9/2001 | Lin ............ 351/136 |
|---|---|---|
| 6,447,117 B1 | 9/2002 | Estrada et al. |
| 6,925,909 B1 * | 8/2005 | Crosby et al. ...... 81/44 |

FOREIGN PATENT DOCUMENTS

| DE | 3414686 | * 10/1985 |
|---|---|---|
| EP | 1 107 042 | 6/2001 |
| GB | 775 293 | 5/1957 |
| GB | 927 499 | 5/1963 |
| WO | WO 00/29896 | 5/2000 |
| WO | WO 02 211 93 | 3/2002 |
| WO | WO 02/095482 | 11/2002 |

\* cited by examiner

*Primary Examiner*—Hung Xuan Dang
(74) *Attorney, Agent, or Firm*—Collard & Roe, P.C.

(57) ABSTRACT

An interlocking connection is described between a piece of wire (4) and a molded body (1) injected from plastic, especially for spectacles, with one end of the wire piece (4) being anchored in the molded body (1) by way of two sections of a fixing device which are arranged adjacent to each other. In order to provide simple constructional conditions it is proposed that the piece of wire (4) comprises an end (5) which is bent in a hairpin-like manner and whose legs (6, 7) form a fixing means, and with the end (5) bent in a hairpin-like manner of the piece of wire engaging in an interlocking manner in a plug-in receiving means (8) of the molded body (1), which receiving means is adjusted to the hairpin-like shape of the end of the wire (5) and forms an undercut.

2 Claims, 2 Drawing Sheets

FORM-FITTING CONNECTION BETWEEN A PIECE OF WIRE AND AN INJECTION-MOLDED PLASTIC BODY, PARTICULARLY FOR EYEGLASSES

CROSS REFERENCE TO RELATED APPLICATIONS

Applicant claims priority under 35 U.S.C. §119 of Austria Application No. A 517/2002 filed on Apr. 3, 2002. Applicant also claims priority under 35 U.S.C. §365 of PCT/AT2003/000086 filed on Mar. 27, 2003. The international application under PCT article 21 (2) was not published in English.

FIELD OF THE INVENTION

The invention relates to an interlocking connection between a piece of wire and a molded body injected from plastic, especially for spectacles, with one end of the piece of wire being anchored in the molded body by way of two sections of a fixing device which are arranged adjacent to one another.

DESCRIPTION OF THE PRIOR ART

For the purpose of fastening the end of a piece of wire to a molded body injected from plastic such as the pieces of wire carrying the nose pads on the bridge of spectacles it is known to solder or weld two parallel fastening pins to the bent-off end of the piece of wire, which pins are provided with annular bulges which are barb-like in their cross section and engage in two recesses of the molded body in an interlocking fashion. The fastening pins which are pressed into the recesses of the molded body made of plastic cut with the barb-like annular bulges into the walls of the recesses, thus leading to a tension-proof anchoring of the fastening pins in the recesses of the molded body. The parallel fastening pins also lead to a fixing of the piece of wire which is resistant to twisting relative to the molded body, leading to advantageous fastening conditions. The disadvantageous aspect in this fastening via parallel fastening pins is especially increased constructional effort required by the soldering or welding. The soldering or welding points are susceptible to corrosion and increase the likelihood of breakage when the piece of wire is to be bent relative to the molded body holding the same, e.g. for the purpose of adjusting the nose pad of the spectacles.

SUMMARY OF THE INVENTION

The invention is thus based on the object of providing an interlocking connection between a piece of wire and a molded body injected from plastic of the kind mentioned above in such a way that with a low constructional effort it is possible to ensure a secure, favorably loadable connection between the end of the piece of wire and the molded body made of plastic.

This object is achieved by the invention in such a way that the piece of wire comprises an end which is bent in a hairpin-like manner and whose legs form a fixing means. With the end bent in a hairpin-like manner of the piece of wire engaging in a plug-in receiving means which is adjusted to the hairpin-like shape of the end of the wire and forms an undercut.

By bending back the free end of the piece of wire to be fastened into the shape of a hairpin, the two legs of the hairpin-like end produce two sections of a fixing means which extend parallel to each other and which allows a twist-proof anchoring of the piece of wire in the molded body without having to solder or weld additional pins to the end of the piece of wire to be fastened, so that the disadvantages linked to such a soldered or welded connection are avoided. Nevertheless, it is still possible to achieve an axially secure fixing of the end of the piece of wire in the molded body made of plastic material when the molded body comprises a plug-in receiving means for the end of the wire which is adjusted to the shape of a hairpin of the end of the wire and forms an undercut because the undercut in combination with the section of the hairpin-like end of wire which grasps behind the undercut will prevent any retraction of the end of the wire from the plug-in receiving means. The elasticity of the plastic material or of the hairpin-like bent wire end allows the insertion of the wire end in the undercut plug-in receiving means of the molded body in a simple fashion.

In order to create respective conditions for grasping behind the undercut plug-in receiving means by the wire end bent in a hairpin-like fashion, the legs of the hairpin-like end can converge towards the adjacent section of the piece of wire, so that the largest width is obtained in the region of the bent web which join the two legs of the hairpin-like end. A plug-in receiving means adjusted to such a wire end forms an undercut which can hardly be removed from the mold. The wedge region obtained by using a round wire piece between the two legs of the hairpin-like end is advantageously used for the axial anchoring of the piece of wire in the plug-in receiving means, such that the plug-in receiving means forms wall sections projecting into said wedge regions. Said projecting wall sections position themselves in front of the bent web of the hairpin-like end connecting the two legs with each other and thus prevent any retraction of the wire piece from the plug-in receiving means of the molded body. The negative shape of the plug-in receiving means for the web of the wire end connecting the two legs with each other does not need to be provided in a mandatory way with an undercut of the wall sections projecting into the wedge region between the two legs. As a result of the pressure between the web and the projecting walls sections which is obtained during the insertion of the wire end in the plug-in receiving means, it is possible that an indentation can be formed which is adjusted to the cross-sectional shape of the web by cold flowing of the plastic material in the region of the web, which indentation ensures an interlocking anchoring of the hairpin-like end in the plug-in receiving means.

Another possibility of a tension-proof anchoring is providing the leg of the hairpin-like end of the wire piece which is bent back relative to the other leg with an enlargement which is averted from the other leg and is formed by crushing, which enlargement subjects the subsequent wall of the plug-in receiving means with a pressure load with the effect that the plastic material in the region of the enlargement is displaced by cold flowing and an indentation is obtained in the wall of the plug-in receiving means which receives the enlargement, is representative of an undercut and ensures a protection against withdrawal of the hairpin-like bent end of the wire piece. It is understood that the enlargement of the one leg of the hairpin-like end can also be used additionally in connection with the walls sections of the plug-in receiving means which project into the wedge region between the legs in order to ensure especially advantageous anchoring conditions. Since the enlargement weakens the leg which is bent back relative to the continuing leg, said weakening has no effect on the tenacity of the connection between the piece of wire and the molded body. The bending of the piece of wire held in the molded body especially stresses the leg converging directly into the piece of wire, whereas the other bent-back leg merely assumes a securing effect against turning and retraction.

BRIEF DESCRIPTION OF THE DRAWINGS

The subject matter of the invention is shown by way of example in the drawings, wherein.

DESCRIPTION OF THE PREFERRED EMBODIMENTS

Figure 3:
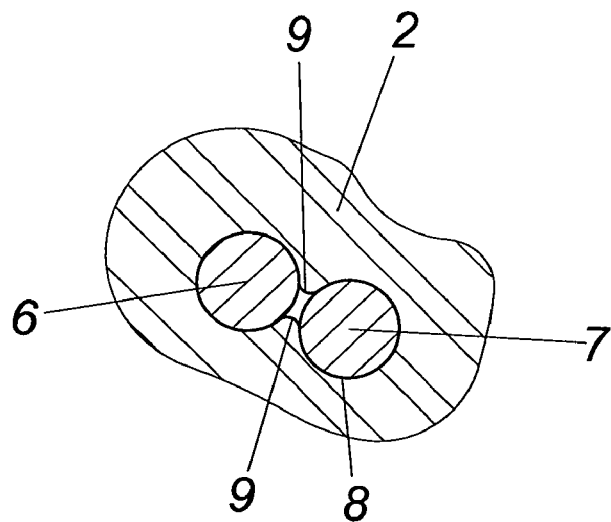
FIG. 3 shows a sectional view along the line III—III of FIG. 1 on an enlarged scale.

The molded body 1 is formed according to the illustrated embodiments by bridge 2 of spectacles (not shown in closer detail) whose nose pads 3 are fastened by means of wire pieces 4 to the bridge 2. For this purpose, the wire piece 4 forms a hairpin-like end 5 whose legs are designated with reference numerals 6 and 7. Plug-in receiving means 8 are provided in the bridge 2, which receiving means correspond to the contour of the hairpin-like end 5 of the wire piece 4 and receive the hairpin-like ends 5 of the wire piece 4. As can be seen in FIG. 3, the plug-in receiving means 8 comprises walls sections 9 against the wedge section, which wall sections project between the two legs 6 and 7 and extend up to the bent web of the hairpin-like end 5 which connects the two legs 6 and 7, so that said projecting wall sections 9 are grasped behind by said web, leading to a tension-proof anchoring of the hairpin-like end 5 in the plug-in receiving means 8. As a result of the elasticity of the plastic material of the molded part 1, the projecting wall sections 9 can be elastically deformed upon insertion of the hairpin-like end 5 in the plug-in receiving means 8 until the web between the legs 6 and 7 latches into the undercut at the end of the wall section 9. Such an undercut need not be provided right from the start. As a result of the pressure exerted by the web of the inserted wire end 5 on the continuous wall section 9, a cold flow of the plastic material in the region of the web is obtained, so that an indentation is obtained which is adjusted to the cross-sectional shape of the web and which ensures an interlocking fixing of the web in the plug-in receiving means 8.

Figure 4:
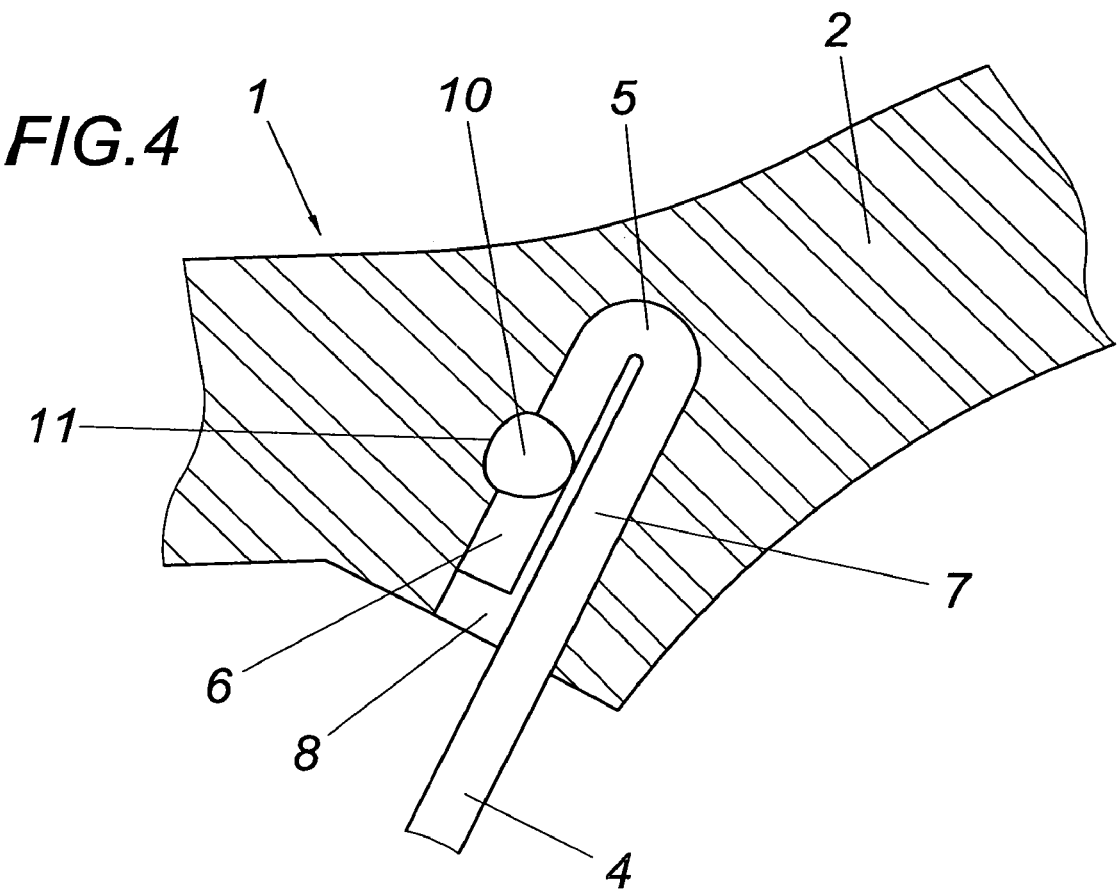
FIG. 4 shows a constructional variant of an interlocking connection in a longitudinal sectional view on an enlarged scale.

According to the embodiment according to FIG. 4, the bent-back leg 6 of the hairpin-like end 5 comprises an enlargement 10 which is produced by crushing and faces away from the leg 7. Said enlargement 10 produces a pressure load on the wall of the plug-in receiving means 8, so that the plastic material of the bridge 2 is permanently deformed in this region by cold flowing and forms an indentation 11 into which the enlargement 10 latches, as a result of which the hairpin-like end 5 of the wire piece 4 is anchored in the respective plug-in receiving means 8 in a tension-proof manner. The indentation 11 leads to an undercut of plug-in receiving means 8 which is grasped behind by the enlargement 10.

Figure 1:
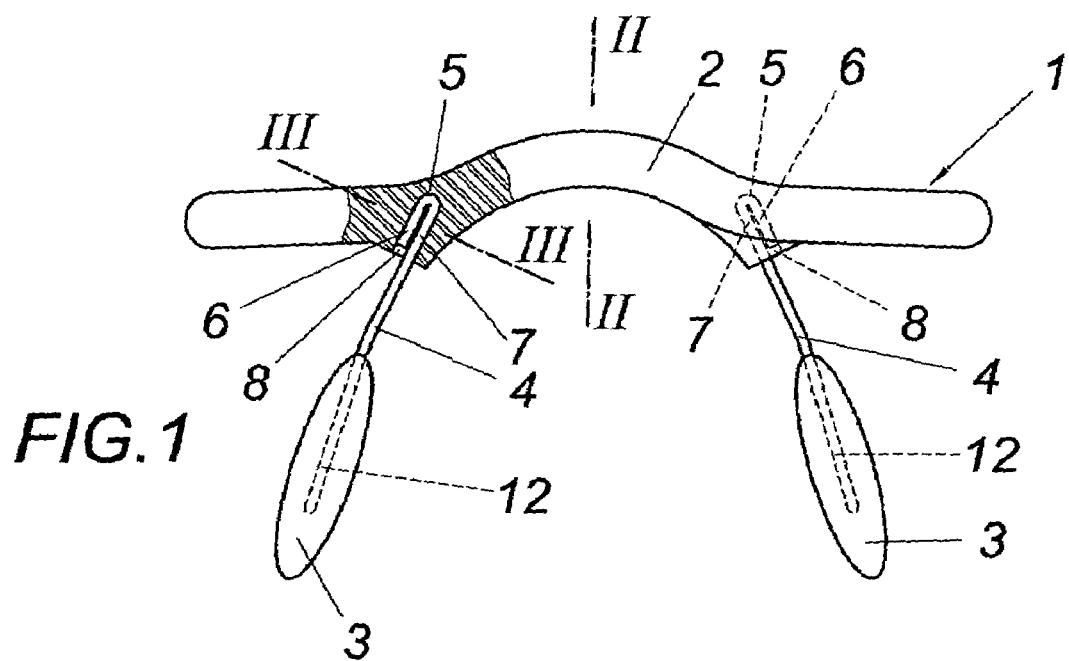
FIG. 1 shows an interlocking connection in accordance with the invention between a piece of wire for holding a nose pad and a bridge made of plastic for spectacles in a partly elevated view.
Figure 2:
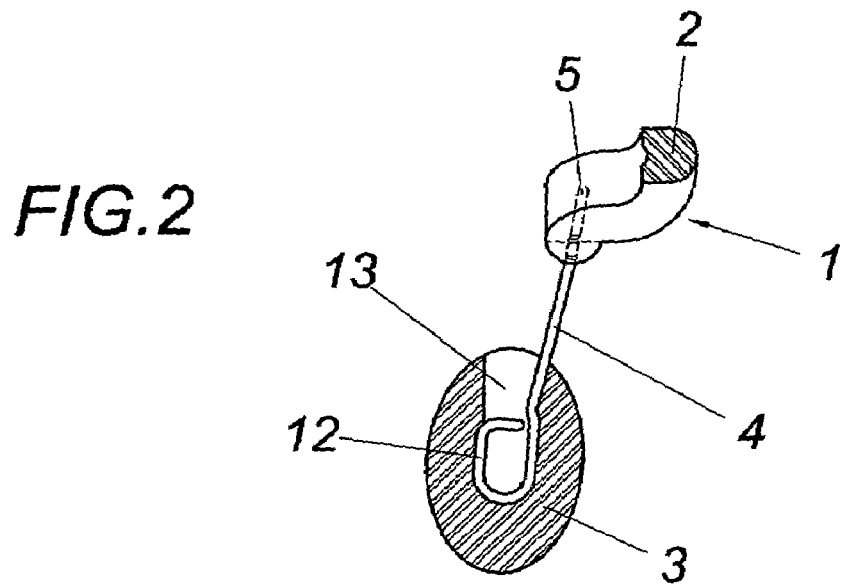
FIG. 2 shows a sectional view along line II—II of FIG. 1.

At the ends associated with the nose pads 3, the wire pieces 4 form bent eyes 12 which engage in the undercut receiving means 13 of the nose pads 3 in a self-latching manner, as is shown in FIG. 2. Simple connections are thus obtained both with respect to the nose pads 3 as well as with respect to the bridge 2, which connections meet the respective requirements placed on the required tenacity.

The invention claimed is:

1. An interlocking connection between a hairpin-shaped end of a wire and an injection-molded plastic body, the wire being bent over to form one of two like legs of the hairpin-shaped wire end, and the hairpin-shaped wire end interlockingly engaging a plug-in receiving means in the injection-molded plastic body, the receiving means conforming to the shape of the hairpin-shaped wire end and forming an undercut for interlockingly and frictionally engaging the hairpin-shaped wire end.

2. The interlocking connection of claim 1, wherein the one leg of the hairpin-shaped wire end has an enlargement averted from the other leg of the hairpin-shaped wire end, the undercut being formed by the enlargement projecting into the injection-molded plastic body.

* * * * *

UNITED STATES PATENT AND TRADEMARK OFFICE
CERTIFICATE OF CORRECTION

PATENT NO. : 7,147,322 B2
APPLICATION NO. : 10/508291
DATED : December 12, 2006
INVENTOR(S) : Spindelbalker It is certified that error appears in the above-identified patent and that said Letters Patent is hereby corrected as shown below:

The cover page, column 1, item [30], please correct the number of the Claim of Priority of the Foreign Application Priority data from "A517/2003" to correctly read:
-- A517/2002--.

Signed and Sealed this

Twenty-seventh Day of February, 2007

JON W. DUDAS
*Director of the United States Patent and Trademark Office*